(12) United States Patent
Kim et al.

(10) Patent No.: US 10,770,712 B2
(45) Date of Patent: Sep. 8, 2020

(54) POUCH-TYPED BATTERY CELL COMPRISING ELECTRODE LEAD HAVING CURRENT BREAKING FUNCTION

(71) Applicant: LG CHEM, LTD., Seoul-si (KR)

(72) Inventors: Sang Hun Kim, Daejeon (KR); Yong Kim, Daejeon (KR); Min Hyeong Kang, Daejeon (KR); Cho Long Kim, Daejeon (KR); Hyung Kyun Yu, Daejeon (KR); Ji Hoon Lee, Daejeon (KR); Yong Su Choi, Daejeon (KR); Soo Ji Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 275 days.

(21) Appl. No.: 15/862,029

(22) Filed: Jan. 4, 2018

(65) Prior Publication Data

US 2018/0198109 A1   Jul. 12, 2018

(30) Foreign Application Priority Data

Jan. 6, 2017 (KR) ........................ 10-2017-0002338

(51) Int. Cl.
```
H01M 2/34       (2006.01)
H01M 2/06       (2006.01)
H01M 2/26       (2006.01)
H01M 2/02       (2006.01)
H01M 10/0585    (2010.01)
H01M 10/04      (2006.01)
H01M 2/22       (2006.01)
H01M 2/30       (2006.01)
```
(52) U.S. Cl.
CPC ......... *H01M 2/345* (2013.01); *H01M 2/0262* (2013.01); *H01M 2/0275* (2013.01); *H01M 2/0287* (2013.01); *H01M 2/06* (2013.01); *H01M 2/22* (2013.01); *H01M 2/26* (2013.01); *H01M 2/30* (2013.01); *H01M 10/0413* (2013.01); *H01M 10/0585* (2013.01); *H01M 2200/20* (2013.01); *H01M 2220/20* (2013.01)

(58) Field of Classification Search
CPC ...... H01M 2/345; H01M 2/0262; H01M 2/30; H01M 2/22; H01M 10/0413; H01M 2/0287; H01M 10/0585; H01M 2/0275; H01M 2/06; H01M 2/26; H01M 2220/20; H01M 2200/20
See application file for complete search history.

(56) References Cited

U.S. PATENT DOCUMENTS

| | | | |
|---|---|---|---|
| 9,118,072 B2 | 8/2015 | Yang et al. | |
| 9,269,960 B2 | 2/2016 | Yang et al. | |
| 2011/0143177 A1* | 6/2011 | Jeon | H01M 2/348 429/61 |
| 2016/0126526 A1 | 5/2016 | Yang et al. | |
| 2017/0110711 A1* | 4/2017 | Ahn | H01M 2/345 |
| 2017/0110712 A1* | 4/2017 | Ahn | H01M 2/021 |
| 2018/0090793 A1* | 3/2018 | Choi | H01M 2/345 |

FOREIGN PATENT DOCUMENTS

| | | |
|---|---|---|
| KR | 10-1278503 B1 | 7/2013 |
| KR | 10-1310735 B1 | 9/2013 |
| KR | 10-1455769 B1 | 11/2014 |
| KR | 10-1483425 B1 | 1/2015 |
| KR | 10-2017-0044941 A | 4/2017 |

OTHER PUBLICATIONS

Office Action dated Jul. 1, 2019, from Korean Patent Office in related technology Korean application No. 10-2017-0015098.

* cited by examiner

*Primary Examiner* — Muhammad S Siddiquee
(74) *Attorney, Agent, or Firm* — Morgan, Lewis & Bockius LLP

(57) ABSTRACT

A battery cell includes an electrode assembly and a battery case. The electrode assembly includes a positive electrode, a negative electrode, and a separator interposed between the positive electrode and the negative electrode. The battery case includes an upper case and a lower case, at least one of the upper case and the lower case being provided with a receiving part, in which the electrode assembly is mounted. One end of each of electrode tabs extending from electrode plates of the electrode assembly is coupled to a corresponding end of an electrode lead, which protrudes outward from the battery case. The electrode lead is provided with at least one notch part configured to rupture in response to expansion deformation of the battery case when the pressure in the battery cell increases to achieve the electrical cutoff of the battery.

9 Claims, 4 Drawing Sheets

[FIG. 1]
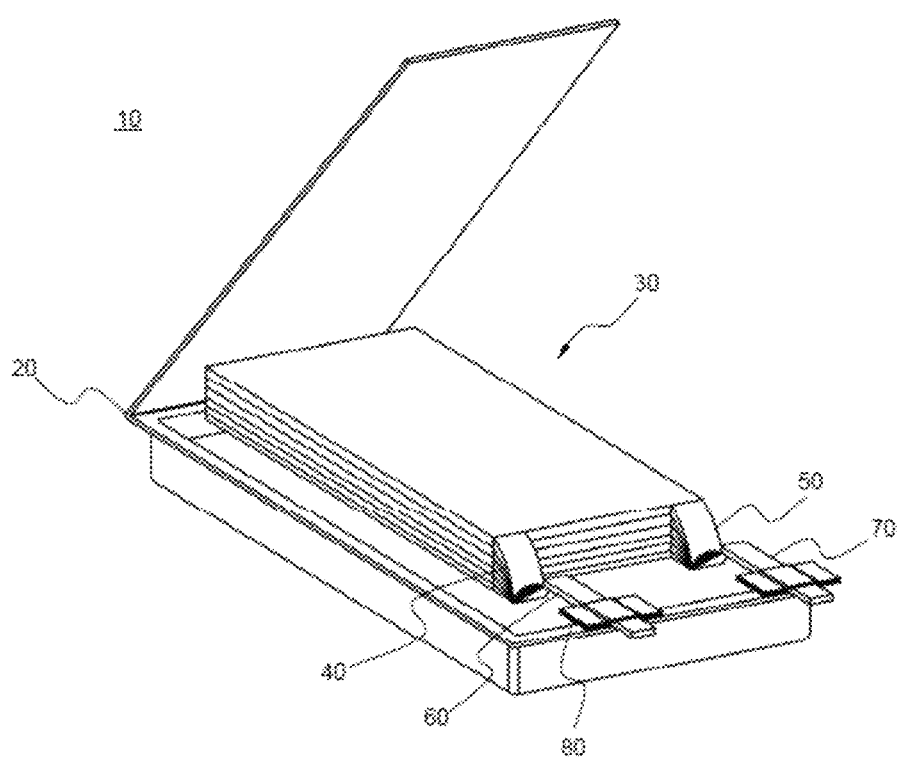

[FIG. 2]
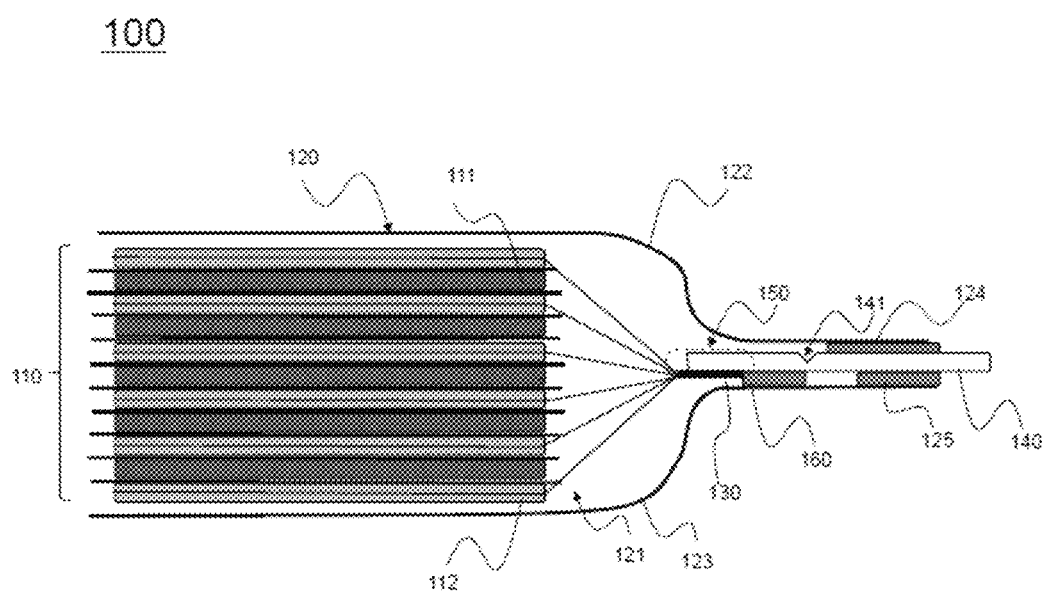

[FIG. 3]
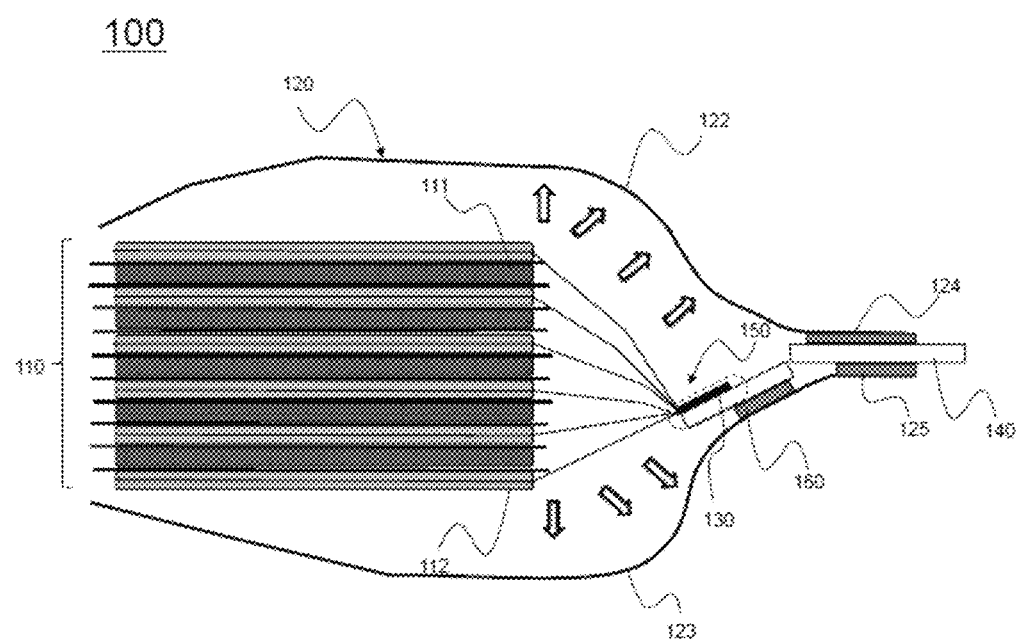

[FIG. 4]
200
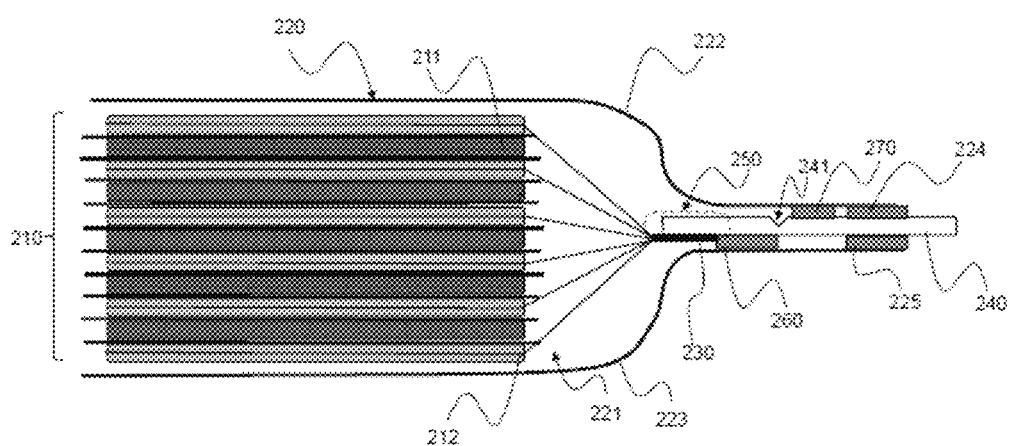

POUCH-TYPED BATTERY CELL COMPRISING ELECTRODE LEAD HAVING CURRENT BREAKING FUNCTION

CROSS-REFERENCE TO RELATED APPLICATIONS

This application claims the benefit of Korean Patent Application No. 2017-0002338 filed on Jan. 6, 2017 with the Korean Intellectual Property Office, the disclosure of which is herein incorporated by reference in its entirety.

TECHNICAL FIELD

The present invention relates to a pouch-shaped battery cell including an electrode lead having a current interrupt function.

BACKGROUND ART

With the remarkable development of information technology (IT), a great variety of portable information communication devices has been popularized. As a result, in the $21^{st}$ century, we are moving toward a society based on ubiquitous access, in which high-quality information service is possible regardless of time or place.

Lithium secondary batteries are very important in realizing such ubiquity. Specifically, lithium secondary batteries, which can be charged and discharged, have been widely used as energy sources for wireless mobile devices. In addition, lithium secondary batteries have also been used as energy sources for electric vehicles and hybrid electric vehicles, which have been proposed to solve problems, such as air pollution, caused by existing gasoline and diesel vehicles using fossil fuel.

As devices to which the lithium secondary batteries are applicable are becoming more diverse, as described above, lithium secondary batteries have also been diversified such that the lithium secondary batteries can provide outputs and capacities suitable for the devices to which the lithium secondary batteries are applied. In addition, there is a strong need to reduce the size and weight of lithium secondary batteries.

Based on the shape thereof, the lithium secondary batteries may be classified into a cylindrical battery cell, a prismatic battery cell, and a pouch-shaped battery cell. Among these kinds of lithium secondary batteries, much interest is currently focused on the pouch-shaped battery cell, which can be stacked with high integration, has high energy density per unit weight, can be manufactured at low cost, and can be easily modified.

The pouch-shaped battery cell is configured to have a structure in which an electrode assembly having a positive electrode/separator/negative electrode structure is contained in a battery case made of a laminate sheet together with an electrolyte in the state in which the outer edge of the battery case is sealed by thermal fusion.

FIG. 1 schematically shows the general structure of a representative pouch-shaped battery cell 10 including a stacked type electrode assembly.

Referring to FIG. 1, the pouch-shaped lithium secondary battery 10 includes an electrode assembly 30, electrode tabs 40 and 50 extending from the electrode assembly 30, electrode leads 60 and 70 connected respectively to the electrode tabs 40 and 50 by welding, and a battery case 20 for receiving the electrode assembly 30.

The electrode assembly 30 is a power generating element including positive electrodes and negative electrodes sequentially stacked in the state in which separators are interposed respectively between the positive electrodes and the negative electrodes. The electrode assembly 30 is configured to have a stacked type structure or a stacked/folded type structure. The electrode tabs 40 and 50 extend from corresponding electrode plates of the electrode assembly 30. The electrode leads 60 and 70 are electrically connected to the electrode tabs 40 and 50, extending from the corresponding electrode plates of the electrode assembly 30, respectively, for example, by welding. The electrode leads 60 and 70 are partially exposed outward from the battery case 20. In addition, insulative films 80 for improving a seal between the battery case 20 and the electrode leads 60 and 70 and, at the same time, securing electrical insulation between the battery case 20 and the electrode leads 60 and 70 are attached to portions of the upper and lower surfaces of the electrode leads 60 and 70.

The battery case 20 is made of an aluminum laminate sheet. The battery case 20 has a space defined therein to receive the electrode assembly 30. The battery case 20 is generally formed in the shape of a pouch. In the case in which the electrode assembly 30 is a stacked type electrode assembly as shown in FIG. 1, the inner upper end of the battery case 20 is spaced apart from the electrode assembly 30 such that the positive electrode tabs 40 and the negative electrode tabs 50 can be coupled to the electrode leads 60 and 70, respectively.

Each of the electrode tabs of the pouch-shaped secondary battery is made of foil having a thickness of 0.5 mm or less. The electrode tabs of the pouch-shaped secondary battery are electrically connected to the electrode leads and are coupled to each other by welding.

When gas is continuously generated in the conventional pouch-shaped battery cell having the above structure due to overcurrent and overvoltage in the battery cell during the charge and discharge of the battery cell, however, the pressure of the gas in the battery cell excessively increases. As a result, a portion of the sealed region of the battery case is open, i.e. a vent is formed in the battery case, whereby the gas is discharged from the battery case. Even in this state, charging and discharging current continuously flows in the electrode assembly, since the electrode assembly, in which current flows, is not affected. As a result, gas is continuously generated in the battery cell, and the gas is discharged out of the battery cell. The discharged gas is harmful to the human body. In addition, the temperature of the battery cell increases, which may result in the ignition and explosion of the battery cell.

The conventional pouch-shaped battery cell is configured to include an additional system disposed outside the battery cell for preventing gas from being generated in the battery cell and preventing further reaction from taking place in the battery cell when the battery cell is saturated. When the external system malfunctions, however, abnormal charge and discharge are continuously performed in the battery cell, whereby the performance and safety of the battery cell are lowered.

Therefore, there is a strong necessity for a battery call that is capable of solving the above problems.

DISCLOSURE

Technical Problem

The present invention has been made to solve the above problems and other technical problems that have yet to be resolved.

It is an object of the present invention to provide a battery cell configured such that when gas is generated in the battery cell due to abnormal reaction in the battery cell and the pressure in the battery cell is increased by the gas, a lead member is ruptured to thus interrupt the flow of current in the battery cell, whereby the safety of the battery cell is improved.

Technical Solution

The above and other objects can be accomplished by the provision of a battery cell including an electrode assembly, including a positive electrode, a negative electrode, and a separator interposed between the positive electrode and the negative electrode, and a battery case, including an upper case and a lower case, at least one of the upper case and the lower case being provided with a receiving part, in which the electrode assembly is mounted, wherein one end of each of electrode tabs extending from electrode plates of the electrode assembly is coupled to a corresponding end of an electrode lead, which protrudes outward from the battery case, the electrode lead is provided with at least one notch part configured to rupture in response to expansion deformation of the battery case when the pressure in the battery cell increases in order to achieve the electrical cutoff of the battery, the electrode lead is connected to one of the upper case and the lower case by fusion in the state in which a first insulative film is interposed between a portion of one surface of the electrode lead that is adjacent to the electrode assembly on the basis of the notch part and the inner surface of the one of the upper case and the lower case, and the electrode lead is connected to the upper case and the lower case by fusion in order to seal the battery case in the state in which second insulative films are interposed respectively between portions of opposite surfaces of the electrode lead that is distant from the electrode assembly on the basis of the notch part and the inner surfaces of the upper case and the lower case.

In the battery cell according to the present invention, therefore, the electrode lead is divided into a portion of the electrode lead that is adjacent to the electrode assembly and a portion of the electrode lead that is distant from the electrode assembly on the basis of the notch part formed in the electrode lead due to expansion deformation of the battery case when the pressure in the battery cell increases, whereby the rupture of the electrode lead is achieved. Consequently, it is possible to interrupt the continuous flow of current, whereby the safety of the battery cell is secured.

As a method of interrupting the flow of current when the pressure in the battery cell increases, as described above, the electrode tabs may be coupled to the electrode lead using an insulative tape. When the adhesive force of the insulative tape, by which the electrode tabs are coupled to the electrode lead, is reduced due to high temperature, the coupling between the electrode tabs and the electrode lead may be released when the pressure in the battery cell increases. In this case, however, an insulative tape used to connect the electrode lead to the battery case by fusion is also present, in addition to the insulative tape for coupling the electrode tabs and the electrode lead. Consequently, it is difficult to appropriately adjust the adhesive strength of these insulative tapes. Furthermore, it is difficult to differently design the opening of the battery case and the intensity of an electrical short circuit between the electrode tabs and the electrode lead. Also, in the above structure, it is essentially required to increase the temperature in order to reduce the adhesive force of the insulative tape.

In the structure of the battery cell according to the present invention, on the other hand, the flow of current is interrupted due to the physical rupture of the notch part. Consequently, designing to realize an intended intensity is easily achieved, and it is possible to set the intensity of rupture irrespective of the intensity of opening of the battery case. In addition, physical rupture is achieved irrespective of temperature, i.e. when the pressure in the battery cell increases without an increase in temperature, whereby it is possible to further secure the effect of preventing the ignition of the battery cell due to an increase in temperature that is likely to occur.

Here, the number of notch parts is not particularly restricted. If too many notch parts are formed, the strength of the electrode lead is reduced, and the notch parts may be easily ruptured by small external impacts. For this reason, the number of notch parts may be 2 or less.

The notch part may be formed within a range of 10% to 50% of the total length of the electrode lead from the coupling region between the electrode tabs and the electrode lead.

The electrode tabs are coupled to the electrode lead by welding. As a result, it is difficult to form the notch part in the coupling region between the electrode tabs and the electrode lead. If the notch part is distant from the coupling region between the electrode tabs and the electrode lead, the relative size of a fusion region between the electrode lead and the battery case is reduced, whereby the strength of a seal of the battery cell may be reduced. In addition, the sealing pressure of the battery cell is less than the rupture pressure of the electrode lead, whereby the battery case may open before the electrode lead ruptures. In this case, reliability of rupture is not guaranteed, which is not desirable.

In addition, the notch part may be formed so as to have a depth equivalent to 20 to 80% the total depth of the electrode lead.

Specifically, the depth of the notch part may be set appropriately depending on the allowable pressure of the battery cell. If the depth of the notch part is too small, the intensity of rupture is higher than the intensity of fusion between the electrode lead and the battery case in the state in which the insulative film is interposed therebetween, whereby the notch part may not rupture. If the depth of the notch part is too large, the notch part may rupture too easily. As a result, the notch part may rupture even when the pressure in the battery cell is normal or even when a small external impact is applied to the battery cell, which is not desirable.

Meanwhile, in order for the electrode lead to be easily divided into two parts on the basis of the notch part due to the formation of the notch part, insulative films may be disposed on a portion of the electrode lead that is adjacent to the electrode assembly and a portion of the electrode lead that is distant from the electrode assembly on the basis of the notch part in order to fix the electrode lead by fusion with the battery case, in addition to the second insulative films interposed between and fused to the battery case and the electrode lead. The shape of the insulative films is not particularly restricted.

In a concrete example, as described above, the second insulative films may be interposed between and fused to portions of the opposite surfaces of the electrode lead that are distant from the electrode assembly on the basis of the notch part and the inner surfaces of the upper case and the lower case, and the first insulative film may be interposed between and fused to a portion of one surface of the electrode lead that is adjacent to the electrode assembly on the basis of the notch part and the inner surface of the upper case or the lower case.

At this time, the notch part may be formed in the other surface of the electrode lead, which is opposite the one surface of the electrode lead on which the first insulative film is located.

The reason for this is that, in the case in which the notch part is formed in the other surface of the electrode lead, which is opposite the one surface of the electrode lead, which is fused to the battery case in the state in which the first insulative film is interposed therebetween, the electrode lead may move in the direction in which the notch part is widened when the battery case is deformed by the expansion thereof due to an increase in the pressure in the battery case, whereby the electrode lead may easily rupture.

Also, in the case in which the electrode lead is connected to the upper case and the lower case by fusion in the state in which the second insulative films, by which the electrode lead is fused to the battery case, are interposed respectively between portions of the opposite surfaces of the electrode lead that is distant from the electrode assembly on the basis of the notch part and the inner surfaces of the upper case and the lower case, as described above, one of the second insulative films, interposed respectively between the portions of the opposite surfaces of the electrode lead that is distant from the electrode assembly on the basis of the notch part and the inner surfaces of the upper case and the lower case, may be longer than the other of the second insulative films, in order to securely fix the electrode lead at the surface of the electrode lead that is opposite the surface of the electrode lead on which the first insulative film is located, whereby the notch part can rupture more easily.

On the assumption that the length from the position at which the notch part is formed to the end of the battery case, from which the electrode lead is exposed, is 1, the one of the second insulative films may have a length of 0.8 to 1, the other of the second insulative films may have a length of 0.7 to 0.3, and the ends of the second insulative films that are distant from the notch part may be located at the same position in the longitudinal direction of the electrode lead. In this case, the one of the second insulative films is adjacent to the notch part. Consequently, the fusion between the battery case and the electrode lead is achieved at the region that is adjacent to the notch part, whereby it is possible to further secure the reliability of rupture.

Of course, the other of the second insulative films may have the same length as the one of the second insulative films such that the other of the second insulative films is also located so as to be adjacent to the notch part, and both of the second insulative films may be fused to the electrode lead. In the case in which the second insulative film located on the surface of the electrode lead that is opposite the surface of the electrode lead on which the first electrode lead is located is fused to the electrode lead in the state of being adjacent to the notch part, there are no specific limitations.

That is, in the above structure, for example, a portion of one surface of the electrode lead that is adjacent to the electrode assembly on the basis of the notch part may be fused to the inner surface of the lower case in the state in which the first insulative film is interposed therebetween, a portion of one of the opposite surfaces of the electrode lead that is distant from the electrode assembly on the basis of the notch part may be fused to the inner surface of the lower case in the state in which one of the second insulative films having a smaller length is interposed therebetween, and a portion of the other of the opposite surfaces of the electrode lead that is distant from the electrode assembly on the basis of the notch part may be fused to the inner surface of the upper case in the state in which the other of the second insulative films having a larger length is interposed therebetween.

Meanwhile, in another concrete example, as described above, the second insulative films may be fused to portions of the opposite surfaces of the electrode lead that is distant from the electrode assembly on the basis of the notch part, a portion of one surface of the electrode lead that is adjacent to the electrode assembly on the basis of the notch part may be fused to the inner surface of the upper case or the lower case in the state in which the first insulative film is interposed therebetween, the second insulative films, interposed respectively between the portions of the opposite surfaces of the electrode lead that is distant from the electrode assembly on the basis of the notch part and the inner surfaces of the upper case and the lower case, may have the same length, and an auxiliary insulative film may be further interposed between and fused to the surface of the electrode lead in which the notch part is formed, i.e. the surface of the electrode lead that is opposite the surface of the electrode lead on which the first insulative film is located, and the inner surface of the battery case, so as to be located between the notch part and one of the second insulative films that is distant from the electrode assembly.

Consequently, it is possible to securely fix the electrode lead through fusion between the battery case and the electrode lead in the state in which the insulative film is located so as to be adjacent to the notching part by the provision of the auxiliary insulative film without changing the length of the second insulative films such that the second insulative films have different lengths, whereby it is possible to more easily rupture the notch part.

Each of the insulative films may be a polypropylene film or a polyimide film. However, the material of each of the insulative films is not particularly restricted as long as the material of each of the insulative films is capable of increasing adhesive intensity while securing insulation between the electrode lead and the battery case.

The material of the electrode lead may be set depending on the kind of the electrode tabs that are coupled thereto. For example, the electrode lead may be made of Al, Cu, Ni, or Cu plated with Ni. However, the present invention is not limited thereto.

Meanwhile, the positive electrode tabs and the negative electrode tabs may be formed in the same direction. In the case in which the positive electrode tabs and the negative electrode tabs are formed in the same direction, the electrode tabs may be cut even when the battery case is deformed by the expansion thereof in one direction, in which the electrode tabs are formed, whereby it is possible to rapidly interrupt the flow of current in the battery cell.

Alternatively, the positive electrode tabs and the negative electrode tabs may be formed in opposite directions. In the case in which the positive electrode tabs and the negative electrode tabs are formed in opposite directions, the electrode tabs may be cut even when the battery case is deformed by the expansion thereof in one of the opposite directions, in which the electrode tabs are formed, whereby it is possible to interrupt the flow of current in the battery cell.

The battery case may be made of a laminate sheet including an outer resin layer, a metal blocking layer, and a thermally fusible resin sealant layer.

It is required for the outer resin layer to exhibit high resistance to the external environment. Consequently, it is required for the outer resin layer to exhibit greater than predetermined tensile strength and weather resistance. For this reason, the outer resin layer may be made of a polymer resin, such as polyethylene terephthalate (PET) or oriented nylon film.

It is required for the metal blocking layer to have a function of increasing the strength of the battery case in addition to a function of preventing the introduction or leakage of foreign matter, such as gas or moisture. To this end, the metal blocking layer may be made of aluminum.

The resin sealant layer may be made of a polyolefin resin which exhibits a high thermal fusion property (thermal adhesive property) and a low hygroscopic property, which is necessary to restrain permeation of an electrolyte, and is not expanded and not corroded by the electrolyte. More specifically, the resin sealant layer may be made of cast polypropylene (CPP).

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of the Li therein is partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted as long as the conductive agent exhibits high conductivity while the conductive agent does not cause any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; a conductive whisker, such as zinc oxide or potassium titanate; a conductive metal oxide, such as titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit on the filler as long as it does not cause chemical changes in a battery to which the filler is applied and it is made of a fibrous material. As examples of the filler, there may be used olefin polymers, such as polyethylene and polypropylene; and fibrous materials, such as glass fiber and carbon fiber.

The negative electrode may be manufactured by applying and drying a negative electrode active material to a negative electrode current collector. The above-described components may be selectively added to the negative electrode active material as needed.

As the negative electrode active material, for example, there may be used carbon, such as a non-graphitizing carbon or a graphite-based carbon; a metal composite oxide, such as $Li_xFe_2O_3$ (0≤x≤1), $LixWO_2$ (0≤x≤1), $Sn_xMe_{1-x}Me'_yO_z$ (Me: Mn, Fe, Pb, Ge; Me': Al, B, P, Si, Group 1, 2 and 3 elements of the periodic table, halogen; 0≤x≤1; 1≤y≤3; 1≤z≤8); lithium metal; a lithium alloy; a silicon-based alloy; a tin-based alloy; a metal oxide, such as SnO, $Sn_{O2}$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The battery cell may be a lithium secondary battery. Specifically, the battery cell may be a lithium ion battery or a lithium ion polymer battery.

In general, the lithium secondary battery may be configured such that an electrode assembly is mounted in a battery case in the state of being impregnated with a non-aqueous electrolytic solution containing lithium salt.

The non-aqueous electrolytic solution containing lithium salt is composed of a polar organic electrolytic solution and lithium salt. As the electrolytic solution, a non-aqueous liquid electrolytic solution, an organic solid electrolyte, or an inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolytic solution, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas.

Advantageous Effects

As is apparent from the above description, the battery cell according to the present invention is configured such that at least one notch part is formed in the electrode lead. When the pressure in the battery cell increases, therefore, the electrode lead ruptures due to expansion deformation of the battery case. Consequently, the flow of current in the battery cell is interrupted, whereby the safety of the battery cell is improved. In addition, it is possible to design individual rupture thresholds, whereby it is possible to deal with various demands of customers.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view of a conventional pouch-shaped battery cell;

FIG. 2 is a side see-through view of a battery cell according to an embodiment of the present invention;

FIG. 3 is a side see-through view of the battery cell of FIG. 2, showing the shape in which an electrode lead is broken when the pressure in the battery cell increases; and FIG. 4 is a side see-through view of a battery cell according to another embodiment of the present invention.

DETAILED DESCRIPTION OF THE INVENTION

Now, exemplary embodiments of the present invention will be described in detail with reference to the accompanying drawings. It should be noted, however, that the illustrated embodiments are given for easier understanding of the present invention and thus the scope of the present invention is not limited by the illustrated embodiments.

FIG. 2 is a side see-through view schematically showing a battery cell according to an embodiment of the present invention, and FIG. 3 is a side see-through view of the battery cell, schematically showing the shape in which an electrode lead is broken when the pressure in the battery cell increases.

Referring to FIGS. 2 and 3, the battery cell, denoted by reference numeral 100, includes an electrode assembly 110 and a battery case 120.

The electrode assembly 110 includes positive electrodes 111, negative electrodes 112, and separators interposed respectively between the positive electrodes 111 and the negative electrodes 112.

The battery case 120 includes an upper case 122 and a lower case 123. A receiving part 121, in which the electrode assembly 110 is mounted, is formed in the upper case 122 and the lower case 123.

Electrode tabs 130 extend from electrode plates of the positive electrodes 111 and the negative electrodes 112. In FIGS. 2 and 3, which are side see-through views, only electrode tabs 130 extending from the electrode plates of one of the positive and negative electrodes, e.g. from the electrode plates of the negative electrodes 112, are shown. Electrode tabs (not shown) extending from the electrode plates of the positive electrodes 111 may extend in the same direction as the direction in which the electrode tabs 130 of the negative electrodes 112 extend, or may extend in the direction that is opposite the direction in which the electrode tabs 130 of the negative electrodes 112 extend.

One end of each of the electrode tabs 130 extending from the electrode plates of the negative electrodes 112 is coupled to a corresponding end of an electrode lead 140, which protrudes outward from the battery case 120, by ultrasonic welding to constitute a coupling region 150.

The electrode lead 140 according to the present invention is provided with a notch part 141, which is configured to rupture in response to expansion deformation of the battery case 120 when the pressure in the battery cell 100 increases in order to achieve the electrical cutoff of the battery 100.

In addition, the electrode lead 140 is connected to the lower case 123 by fusion in the state in which a first insulative film 160 is interposed between a portion of one surface of the electrode lead 140 that is adjacent to the electrode assembly 110 on the basis of the notch part 141 and the inner surface of the lower case 123, and the electrode lead 140 is connected to the upper case 122 and the lower case 123 by fusion in order to seal the battery case in the state in which second insulative films 124 and 125 are interposed respectively between portions of opposite surfaces of the electrode lead 140 that is distant from the electrode assembly 110 on the basis of the notch part 141 and the inner surfaces of the upper case 122 and the lower case 123.

One of the second insulative films 124 and 125 that is opposite the first insulative film 160 on the basis of the electrode lead 140, i.e. the second insulative film 124, is longer than the second insulative film 125, which is located on the same side as the second insulative film 124, and is connected to the battery case 120 by fusion. In addition, ends of the second insulative films 124 and 125 that are distant from the notch part 141 are located at the same position in the longitudinal direction of the electrode lead 140. As a result, the second insulative film 124 is connected to the battery case 120 by fusion in the state of being located so as to be closer to the notch part 141 than the second insulative film 125.

On the basis of the notch part 141, therefore, the electrode lead 140 can be securely connected to the lower case 123 by fusion via the first insulative film 160 on the surface of the electrode lead 140 that is opposite the surface of the electrode lead 140 in which the notch part 141 is formed, and the electrode lead 140 can be more securely connected to the upper case 122 by fusion via the second insulative film 124 on the same surface of the electrode lead 140 as the surface of the electrode lead 140 in which the notch part 141 is formed.

Here, the notch part 141 is formed in the surface of the electrode lead 140 that is opposite the surface of the electrode lead 140 on which the insulative films 125 and 160 are located.

When the battery case 120 is deformed by expansion thereof as the pressure in the battery cell 100 increases (as indicated by the arrows), as shown in FIG. 3, therefore, a portion of the electrode lead 140 that is adjacent to the electrode assembly 110 on the basis of the notch part 141 is pushed downward together with the lower case 123, and a portion of the electrode lead 140 that is distant from the electrode assembly 110 on the basis of the notch part 141 remains securely fixed to the upper case 122, whereby the rupture of the electrode lead 140 is effectively achieved.

Meanwhile, FIG. 4 is a side see-through view schematically showing a battery cell 200 according to another embodiment of the present invention.

Referring to FIG. 4, the battery cell 200 is configured to have a structure in which an electrode assembly 210, including positive electrodes 211, negative electrodes 212, and separators interposed respectively between the positive electrodes 211 and the negative electrodes 212, is mounted in a receiving part 221 defined between an upper case 222 and a lower case 223 constituting a battery case 220, in the same manner as in FIGS. 2 and 3. Electrode tabs 230 extend from electrode plates of the negative electrodes 212. (Electrode tabs extending from electrode plates of the positive electrodes 211 are not shown.) One end of each of the electrode tabs 230 extending from the electrode plates of the negative electrodes 112 is coupled to a corresponding end of an electrode lead 240, which protrudes outward from the battery case 220, by ultrasonic welding to constitute a coupling region 250. In addition, the electrode lead 240 is provided with a notch part 241, which is configured to rupture in response to expansion deformation of the battery case 220 when the pressure in the battery cell 200 increases in order to achieve the electrical cutoff of the battery 200.

Meanwhile, compared with the battery cell 100 of FIG. 2, the battery cell 200 is identical to the battery cell 100 of FIG. 2 in that the electrode lead 240 is connected to the lower case 223 by fusion in the state in which a first insulative film 260 is interposed between a portion of one surface of the electrode lead 240 that is adjacent to the electrode assembly 210 on the basis of the notch part 241 and the inner surface of the lower case 223, and the electrode lead 240 is connected to the upper case 222 and the lower case 223 by fusion in order to seal the battery case in the state in which second insulative films 224 and 225 are interposed respectively between portions of opposite surfaces of the electrode lead 240 that is distant from the electrode assembly 210 on the basis of the notch part 241 and the inner surfaces of the upper case 222 and the lower case 223. However, the battery cell 200 is different from the battery cell 100 of FIG. 2 in that the second insulative films 224 and 225 have the same length and in that an auxiliary insulative film 270 is further disposed on and fused to the surface of the electrode lead 240 in which the notch part 241 is formed, i.e. the surface of the electrode lead 240 that is opposite the surface of the electrode lead 240 on which the first insulative film 260 is located, so as to be located between the notch part 241 and the second insulative film 224, which is distant from the electrode assembly 210 on the basis of the notch part 241.

Even in the case in which the second insulative film 224, which is interposed between the upper case 222 and the electrode lead 240, and the second insulative film 225, which is interposed between the lower case 223 and the electrode lead 240, are configured to have the same length, therefore, the electrode lead 240 can be securely fused to the battery case 220 on the surface of the electrode lead 240 in which the notch part 241 is formed by the provision of the auxiliary insulative film 270.

When the battery case 220 is deformed by expansion thereof as the pressure in the battery cell 200 increases, therefore, a portion of the electrode lead 240 that is adjacent to the electrode assembly 210 on the basis of the notch part 241 is pushed downward together with the lower case 223, and a portion of the electrode lead 240 that is distant from the electrode assembly 210 on the basis of the notch part 241 remains securely fixed to the upper case 222, whereby the rupture of the electrode lead 240 is effectively achieved, in the same manner as what is described with reference to FIG. 3.

Hereinafter, the present invention will be described in more detail with reference to the following examples. These examples are provided only for illustration of the present invention and should not be construed as limiting the scope of the present invention.

Manufacture Example

Manufacture of Positive Electrode 96.25 weight % of $LiNi_{0.6}Co_{0.2}Mn_{0.2}O_2$ as a positive electrode active material, 1.5 weight % of Fx35 as a conductive agent, and 2.25 weight % of PVdF as a binder were mixed with N-methyl-2-pyrrolidone (NMP) as a solvent to manufacture a positive electrode mixture slurry. Subsequently, the positive electrode mixture slurry was coated, dried, and pressed over aluminum foil to manufacture a positive electrode.

Manufacture of Negative Electrode 95.6 weight % of a mixture of artificial graphite and natural graphite as a negative electrode active material, 1.0 weight % of Super-C as a conductive agent, 0.3 weight % of SBR as a binder, and 1.1 weight % of CMC as a thickening agent were mixed with water as a solvent to manufacture a negative electrode mixture slurry. Subsequently, the negative electrode mixture slurry was coated, dried, and pressed over copper foil to manufacture a negative electrode.

Manufacture of Secondary Battery

An electrode assembly configured to have a structure in which a PE separator was interposed between the positive electrode and the negative electrode was placed in a pouch-shaped battery case, and an electrolytic solution having an additive, including VC, and 0.7 M of $LiPF_6$+0.3 M of LiFSI as salt dissolved in a solvent of EC:EMC=3:7 was injected into the battery case to manufacture a secondary battery.

Example 1

In the manufacturing example, each of a positive electrode lead and a negative electrode lead configured to be connected respectively to positive electrode tabs and negative electrode tabs was manufactured such that the depth of a notch part was 30% the depth of the electrode lead in order to manufacture a secondary battery as shown in FIG. 2. At this time, the adhesive force between insulative films and the battery case were set to be 6 kgf/15 mm or higher.

Example 2

A secondary battery was manufactured in the same manner as in Example 1 except that each of the positive electrode lead and the negative electrode lead was manufactured such that the depth of the notch part was 50% the depth of the electrode lead.

Example 3

A secondary battery was manufactured in the same manner as in Example 1 except that each of the positive electrode lead and the negative electrode lead was manufactured such that the depth of the notch part was 70% the depth of the electrode lead.

Comparative Example 1

A secondary battery was manufactured in the same manner as in Example 1 except that no notch part was formed in each of the positive electrode lead and the negative electrode lead.

Experimental Example 1

The pressures in the secondary batteries manufactured according to Examples 1 to 3 and Comparative Example 1 were increased. At this time, whether vents were formed in the battery cases of the secondary batteries and the pressures in the secondary batteries that caused electrical short circuits of the secondary batteries were measured. The results are shown in Table 1 below.

TABLE 1

| | Formation of vent (Pressure in battery when vent is formed) | Pressure in battery when electrical short circuit occurs |
|---|---|---|
| Example 1 | x | 2 atm |
| Example 2 | x | 1.5 atm |
| Example 3 | x | 1.0 atm |
| Comparative example 1 | O (3 atm) | |

As can be seen from Table 1, in the battery cell according to the present invention, an electrical short circuit occurs in the battery cell before a vent is formed in the battery cell. Consequently, gas in the battery cell, which is harmful to the human body, is prevented from being discharged from the battery cell. In addition, it is possible to prevent the ignition and explosion of the battery cell, which may be caused by an increase in the temperature of the battery cell due to abnormal operation of the battery cell. In the conventional battery cell, on the other hand, no electrical short circuit occurs in the battery cell until the pressure in the battery cell reaches 3 atm, and a vent is formed in the battery cell when the pressure in the battery cell is 3 atm. As a result, gas in the battery cell, which is harmful to the human body, is discharged from the battery cell. Furthermore, even after the vent is formed in the battery cell, the battery cell is continuously operated, which may result in the ignition and explosion of the battery cell.

In addition, referring to Examples 1 to 3, it can be seen that the pressure in the battery cell varies depending on the depth of the notch part when an electrical short circuit occurs in the battery cell. Consequently, it is possible to adjust the pressure in the battery cell at which the electrical short circuit occurs in the battery cell by adjusting the depth of the notch part, whereby it is possible to easily deal with various demands of customers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cell, comprising:
    an electrode assembly comprising a positive electrode, a negative electrode, and a separator interposed between the positive electrode and the negative electrode; and
    a battery case comprising an upper case and a lower case, at least one of the upper case and the lower case being provided with a receiving part, in which the electrode assembly is mounted, wherein:
    one end of each of electrode tabs extending from the electrode assembly is coupled to a corresponding end of an electrode lead, and the electrode lead extends from the electrode tabs to protrude outward from the battery case,
    the electrode lead is provided with at least one notch part configured to rupture in response to expansion deformation of the battery case when a pressure in the battery cell increases in order to achieve an electrical cutoff of the battery,
    the electrode lead is attached to one of the upper case and the lower case by a first insulative film that is interposed between a portion of one surface of the electrode lead and an inner surface of the one of the upper case and the lower case, the first insulative film is closer to the electrode assembly than the notch part,
    the electrode lead is attached to the upper case and the lower case by second insulative films that are interposed respectively between portions of opposite surfaces of the electrode lead and the inner surfaces of the upper case and the lower case such that the second insulative films are farther from the electrode assembly than the notch part and such that the second insulative films seal the battery case,
    one of the second insulative films is longer than the other of the second insulative films,
    the one of the second insulative films that is longer than the other of the second insulative film is on a surface of the electrode lead that is opposite to the surface of the electrode lead on which the first insulative film is attached, and
    the notch part is formed on the surface of the electrode lead that is opposite to the surface of the electrode lead on which the first insulative film is attached.

2. The battery cell according to claim 1, wherein the notch part is formed at a location on the electrode lead that is 10% to 50% of a total length of the electrode lead from a coupling region between the electrode tabs and the electrode lead.

3. The battery cell according to claim 1, wherein the notch part is formed so as to have a depth of 20 to 80% a total thickness of the electrode lead.

4. The battery cell according to claim 1, wherein the one of the second insulative films that is longer has a length of 0.8 to 1 times a distance from the notch part to an end of the battery case, the other of the second insulative films has a length of 0.7 to 0.3 times the distance from the notch part to an end of the battery case, and ends of the second insulative films away from the notch part are located at a same position in a longitudinal direction of the electrode lead.

5. The battery cell according to claim 1, wherein each of the insulative films is a polypropylene film or a polyimide film.

6. The battery cell according to claim 1, wherein the electrode tabs are coupled to the electrode lead by welding.

7. The battery cell according to claim 1, wherein positive electrode tabs and negative electrode tabs are formed in a same direction.

8. The battery cell according to claim 1, wherein positive electrode tabs and negative electrode tabs are formed in opposite directions.

9. The battery cell according to claim 1, wherein the battery case is made of a laminate sheet comprising an outer resin layer, a metal blocking layer, and a thermally fusible resin sealant layer.

\* \* \* \* \*